United States Patent [19]
Nisley et al.

[11] Patent Number: 5,908,249
[45] Date of Patent: Jun. 1, 1999

[54] BEARING ASSEMBLY HAVING COMPACT AND EFFICIENT SEAL ARRANGEMENT

[75] Inventors: Donald L. Nisley, Greenville; Howard M. Martinie, Simpsonville, both of S.C.

[73] Assignee: Reliance Electric Industrial Company, Cleveland, Ohio

[21] Appl. No.: 08/876,056

[22] Filed: Jun. 13, 1997

[51] Int. Cl.⁶ .............................. F16C 33/72; F16J 15/32
[52] U.S. Cl. ...................... 384/484; 277/351; 277/411; 277/566; 284/480
[58] Field of Search .................... 384/477, 480, 384/484, 486; 277/351, 551, 560, 565, 411, 566

[56] References Cited

U.S. PATENT DOCUMENTS

| | | | |
|---|---|---|---|
| 2,157,299 | 5/1939 | Mercier | 277/565 X |
| 3,325,175 | 6/1967 | Lower | 277/565 |
| 3,499,654 | 3/1970 | Lower | 277/362 |
| 3,595,587 | 7/1971 | Senigalliesi | 277/565 X |
| 3,806,212 | 4/1974 | Piva | 384/484 |
| 3,810,636 | 5/1974 | Gorski | 277/369 |
| 3,934,953 | 1/1976 | Tooley | 384/210 |
| 3,942,849 | 3/1976 | Doyle et al. | 384/487 |
| 4,049,281 | 9/1977 | Bainard | 277/307 |
| 4,304,412 | 12/1981 | Ladin | 384/486 X |
| 4,348,067 | 9/1982 | Tooley | 384/480 |
| 4,411,437 | 10/1983 | Conti | 277/422 |
| 4,432,557 | 2/1984 | Drucktenhengst | 277/351 |
| 4,568,092 | 2/1986 | Hayashida et al. | 277/565 X |
| 4,575,265 | 3/1986 | Tooley | 384/474 |
| 4,592,666 | 6/1986 | Jornhagen | 384/477 |
| 4,632,404 | 12/1986 | Feldle et al. | 384/486 X |
| 4,726,696 | 2/1988 | Dickinson et al. | 384/486 X |
| 4,763,904 | 8/1988 | Martinie | 384/480 X |
| 4,792,242 | 12/1988 | Colanzi et al. | 384/482 |
| 4,792,243 | 12/1988 | Takeuchi et al. | 384/486 |
| 4,832,511 | 5/1989 | Nisley et al. | 384/480 |
| 4,863,292 | 9/1989 | Dreschmann et al. | 384/482 |
| 4,875,786 | 10/1989 | DeWachter | 384/482 |
| 4,906,111 | 3/1990 | Martinie | 384/477 |
| 5,011,301 | 4/1991 | Martinie | 384/140 |
| 5,022,659 | 6/1991 | Otto | 384/486 |
| 5,037,213 | 8/1991 | Uchida et al. | 384/484 X |
| 5,201,533 | 4/1993 | Lederman | 384/147 X |
| 5,207,436 | 5/1993 | Lederman | 384/147 X |
| 5,259,628 | 11/1993 | Nisley | 277/348 |
| 5,387,040 | 2/1995 | Firestone et al. | 384/477 |
| 5,489,156 | 2/1996 | Martinie | 384/538 |
| 5,511,886 | 4/1996 | Sink | 384/486 |
| 5,529,403 | 6/1996 | Martinie | 384/585 |
| 5,536,090 | 7/1996 | Nisley | 384/474 |
| 5,607,240 | 3/1997 | Kajihara et al. | 384/480 |
| 5,649,710 | 7/1997 | Kanda | 277/565 X |

FOREIGN PATENT DOCUMENTS

| | | |
|---|---|---|
| 0051170 | 5/1982 | European Pat. Off. . |
| 0388258 | 9/1990 | European Pat. Off. . |
| 2631672 | 11/1989 | France . |
| 2136891 | 9/1984 | United Kingdom . |

OTHER PUBLICATIONS

SKF Group Catalog 4000 US, pp. 722–723, dated 1991.
Dodge Bearings Catalog, S–2000 Plummer Block Bearing, dated 1996.

*Primary Examiner*—Thomas R. Hannon
*Attorney, Agent, or Firm*—Craig N. Killen; John M. Miller; John J. Horn

[57] ABSTRACT

A bearing assembly includes an inner ring and outer ring defining opposed raceways having a plurality of bearing elements disposed therebetween. The bearing assembly includes an improved sealing arrangement having multiple primary seals for providing sealing with the rotating inner ring. In preferred embodiments, the multiple seals include a rolled riding seal and an oblique contact seal having a center lip therebetween. Unlike the other two primary sealing lips, the center lip preferably provides no more than light engagement with the bearing inner ring. Flingers or configured mounting collars may also be provided to further enhance sealing characteristics

23 Claims, 6 Drawing Sheets

BEARING ASSEMBLY HAVING COMPACT AND EFFICIENT SEAL ARRANGEMENT

BACKGROUND OF THE INVENTION

The present invention relates generally to the art of bearings for facilitating shaft rotation. More particularly, the invention relates to a bearing assembly which incorporates an improved sealing arrangement.

Shaft bearings are typically designed having an inner ring and an outer ring, each defining an annular raceway situated in opposition to one another. A plurality of bearing elements are disposed in a bearing region defined between the opposed raceways, thereby permitting relative rotational displacement of the inner and outer rings. To facilitate this relative rotation, shaft bearings are generally configured so that a lubricant may occasionally be conducted into the bearing area.

Various configurations of seals are often utilized to isolate the interior of the bearing assembly from the ambient environment. For example, it may be desirable to prevent lubricant within the bearing from escaping too quickly to the ambient environment, thus presenting an unsightly appearance on or around the bearing. Additionally, it is desirable to prevent contaminants in the ambient environment from penetrating into the bearing interior and causing damage to the bearing elements located therein.

The degree of sealing necessary for a particular application will depend upon the duty requirements of such application. For example, a light seal may be suitable for high speed and normal contaminate service. In other applications, it may be necessary to provide a bearing assembly having enhanced sealing characteristics. For economic and other considerations, it is desirable that a single bearing assembly be provided that may be easily adapted from a light sealing to a heavy sealing configuration.

SUMMARY OF THE INVENTION

The present invention recognizes and addresses the foregoing disadvantages, and others, of prior art constructions and methods. Accordingly, it is an object of the present invention to provide various novel bearing assemblies.

It is a more particular object of the present invention to provide a bearing assembly having an improved sealing arrangement.

It is a further object of the present invention to provide a bearing assembly having a compact and effective sealing arrangement.

It is also and object of the present invention to provide a bearing assembly having selectable sealing characteristics.

Some of these objects are achieved by a bearing assembly comprising a bearing inner ring defining an inner raceway on an outer surface thereof. A bearing outer ring, defining an outer raceway on an inner surface thereof, is situated with respect to the bearing inner ring such that the outer raceway and the inner raceway are in opposed and spaced apart relation. A plurality of bearing elements are disposed between the inner raceway and the outer raceway to facilitate relative rotation between the bearing inner ring and the bearing outer ring.

The bearing assembly further includes a seal carrier fixed with respect to the bearing outer ring. The seal carrier extends generally radially inward toward the bearing inner ring. A resilient seal element is fixed to the seal carrier and has at least two sealing lips extending therefrom into engagement with the bearing inner ring. These sealing lips include a rolled land riding contact seal and an oblique contact seal.

In some exemplary embodiments, the seal element further comprises a center lip located between the rolled land riding contact seal and the oblique contact seal. The center lip is configured to make no more than light engagement with the bearing inner ring. For example, the center lip may be spaced from the bearing inner ring by a predetermined gap.

Some exemplary embodiments of the bearing assembly further comprise a flinger element. The flinger element is fixed with respect to the bearing inner ring for rotation therewith, and is situated in opposition to the seal carrier. In this case, the seal element may further comprise a secondary lip extending into engagement with the flinger member. The seal carrier and flinger element are preferably configured to define a labyrinthine seal region between an ambient environment and the secondary lip.

The bearing inner ring may define a flinger receiving groove into which the flinger element is press fit. In other embodiments, the flinger element is maintained against an end face of the bearing inner ring.

In some exemplary embodiments, a second resilient seal element is fixed with respect to the bearing inner ring and includes a seal lip which engages the seal carrier. For example, the second resilient seal element may be a V-ring seal mounted in a seating groove of an annular mounting element situated axially external of the seal carrier.

Other objects of the invention are achieved by a bearing assembly comprising a bearing inner ring. The bearing inner ring defines an inner raceway on an outer surface thereof and further defines an axial extension portion. A bearing outer ring, defining an outer raceway on an inner surface thereof, is situated with respect to the bearing inner ring such that the outer raceway and the inner raceway are in opposed and spaced apart relation. A plurality of bearing elements are disposed between the inner raceway and the outer raceway to facilitate relative rotation between the bearing inner ring and the bearing outer ring.

The bearing assembly further includes a seal carrier fixed with respect to the bearing outer ring. The seal carrier includes a resilient seal element fixed thereto, having at least one sealing lip extending into engagement with the bearing inner ring. An annular mounting element, situated about the extension portion, includes an axial protrusion portion configured to oppose the seal carrier and define a labyrinthine seal structure.

In some exemplary embodiments, the labyrinthine seal structure includes a first radial portion and a second radial portion axially offset from the first radial portion. In other embodiments, the annular mounting element defines an annular seating groove containing a second resilient seal element. The second resilient seal element includes a seal lip which engages the seal carrier.

The resilient seal element of the seal carrier may have at least three sealing lips extending into engagement with the bearing inner ring. For example, the three sealing lips may include a rolled land riding contact seal, an oblique contact seal and a center lip located therebetween. Preferably, the center lip is configured to make no more than light engagement with the bearing inner ring. Often, the center lip may be spaced from the bearing inner ring by a predetermined gap.

Still further objects of the invention are achieved by a bearing assembly comprising a first bearing ring defining a first raceway. A second bearing ring, defining a second raceway, is situated with respect to the first bearing ring such that the first raceway and the second raceway are in opposed and spaced apart relation. A plurality of bearing elements are disposed between the first raceway and the second raceway to facilitate relative rotation between the first bearing ring and the second bearing ring.

The bearing assembly further includes a seal carrier fixed with respect to the first bearing ring or the second bearing ring. A resilient seal element, fixed to the seal carrier, has at least three sealing lips extending therefrom into engagement with the other of the first bearing ring or the second bearing ring. The three sealing lips include a rolled land riding contact seal and an oblique contact seal. A center lip, located between the other two, will in many cases make no more that light contact with the bearing ring.

Some exemplary embodiments further include a flinger element situated in opposition to the seal carrier and rotatable with respect thereto. In such cases, the seal element may further comprise a secondary lip extending from the seal carrier into engagement with the flinger element. Preferably, the seal carrier and flinger element are configured to define a labyrinthine seal structure.

Objects of the invention are also achieved by a bearing assembly for receipt of a shaft therein. The bearing assembly comprises a tapered adapter defining a first axial bore for receipt of the shaft therethrough and further defining a tapered outer surface. A bearing inner ring defines a second axial bore having a tapered inner surface for receipt of the tapered adapter therein. A bearing outer ring is situated radially outward of the bearing inner ring to define a bearing region therebetween. A plurality of bearing elements are disposed in the bearing region to facilitate relative rotation between the bearing inner ring and the bearing outer ring.

The bearing assembly further includes first and second seal carriers located on respective opposite sides of the bearing region. The seal carriers are fixed with respect to the bearing outer ring. In addition, first and second resilient seal elements are fixed to respective seal carriers. Each of the seal carriers has at least two contact lips and at least one labyrinth lip located therebetween.

In exemplary embodiments, the contact lips are configured to permit egress of lubricant while inhibiting ingress of extraneous matter. Preferably, one of the contact lips is a rolled land riding contact seal and another of the contact lips is an oblique contact seal.

The bearing assembly may further comprise first and second flinger elements fixed with respect to the bearing inner ring and rotatable therewith. The flinger elements are situated in respective opposition to the first and second seal carriers. In such embodiments, the seal elements may further comprise a secondary lip extending into engagement with a respective flinger element. In addition, each opposed seal carrier and flinger element is preferably configured to define a labyrinthine seal region between an ambient environment and the secondary lip.

In some exemplary embodiments, the flinger elements are maintained against respective end faces of the bearing inner ring. For example, an annular nut and an annular removal ring may be located on respective axial sides of the bearing inner ring to maintain the first and second flinger elements, respectively.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
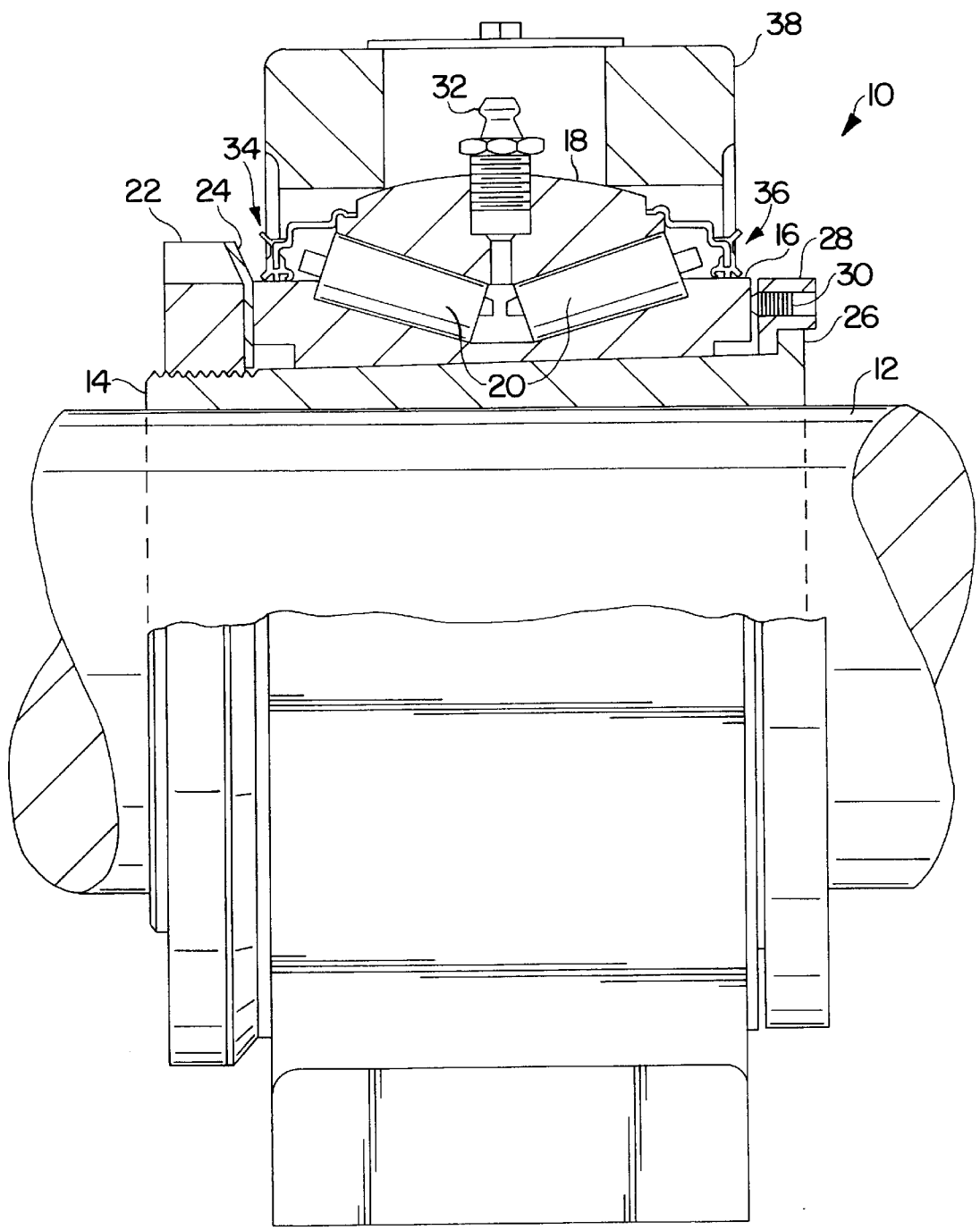
FIG. 1 is a partial cross-sectional view of a bearing assembly constructed in accordance with the present invention.

Repeat use of reference characters in the present specification and drawings is intended to represent same or analogous features or elements of the invention

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a bearing assembly 10 constructed in accordance with the present invention. In this case, bearing assembly 10 is secured to a shaft 12 utilizing a known tapered adapter arrangement. Toward this end, shaft 12 extends through an adapter 14 having a tapered outer surface A bearing inner ring 16 having a tapered inner surface is received about adapter 14. Although shown as a unitary element, one skilled in the art will appreciate that bearing inner ring 16 may often comprise more than one component to facilitate manufacture.

As shown, bearing inner ring 16 defines an inner raceway about its outer circumferential surface. An opposed outer raceway is likewise defined on the inner circumferential surface of bearing outer ring 18. A plurality of bearing elements, such as roller bearings 20, are disposed in the bearing region defined between the inner raceway and the outer raceway to facilitate relative rotation between rings 16 and 18 While roller bearings are illustrated, it should be appreciated that other suitable types of bearing elements, such as ball bearings, may also be utilized for this purpose.

Typically, adapter 14 will define a radial opening, or slot, extending along its entire axial length. This radial opening allows adapter 14 to contract about shaft 12 when its tapered outer surface and the tapered inner surface of inner ring 16 are moved axially together. In the illustrated embodiment, adapter 14 is "pulled" through inner ring 16 by rotation of nut 22. As shown, it will often be desirable to provide a lock washer 24 between nut 22 and the adjacent end face of inner ring 16. As nut 22 is rotated, inner ring 16 will be positively secured to shaft 12 for rotation therewith.

As can be seen, adapter 14 further comprises an annular flange 26 located proximate its larger diameter end. A removal ring 28 is retained between annular flange 26 and the adjacent end face of inner ring 16. Removal ring 28 defines therein a plurality of threaded holes to threadably receive respective screw members, such as screw member 30. When rotated, the screw members engage the side wall of inner ring 16 such that inner ring 16 and adapter 14 will be urged axially apart. In this manner, bearing assembly 10 may be removed from shaft 12.

In the illustrated embodiment, a grease fitting 32 is threaded into a radial bore defined in outer ring 18. As one skilled in the art will recognize, grease fitting 32 permits fresh lubricant to be introduced into the bearing region between inner ring 16 and outer ring 18 when desired. A pair of sealing assemblies 34 and 36 are located on respective opposite axial sides of the bearing region as shown. Sealing assemblies 34 and 36 function to permit purging from the interior of bearing assembly 10 while inhibiting ingress of contaminants from the ambient environment.

A bearing housing may be provided to maintain the various components of bearing assembly 10. In the illustrated embodiment, a pillow block housing 38 is provided, although other suitable housing types, such as a flange housing may also be utilized. It can be seen that bearing outer ring 18 is configured as a separate element from housing 38 in the illustrated embodiment. In some cases, however, it may be desirable to form the outer raceway on an inner circumferential surface of the bearing housing.

Figure 1A:
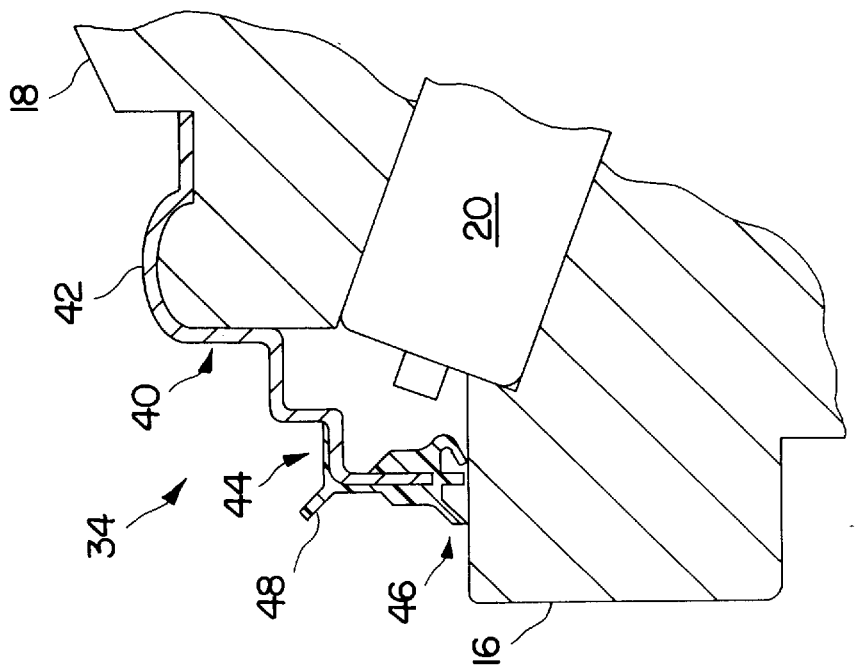
FIG. 1A is an enlarged partial cross sectional view of a seal assembly provided on the bearing of FIG. 1.

The construction of seal assembly 34 can be explained more easily with reference to FIG. 1A. While the construction of seal assembly 36 will not be described in detail for purposes of brevity, it should be understood that seal assembly 36 is similarly constructed. Seal assembly 34 includes a seal carrier 40 preferably constructed of stamped sheet metal or the like. Seal carrier 40 defines a ridge portion 42 clamped over an annular rib defined on the outer surface of outer ring 18. As a result, seal carrier 40 is fixed with respect to outer ring 18 as inner ring 16 rotates with shaft 12.

Seal assembly 34 further includes a resilient seal element 44 fixed to seal carrier 40. As will be explained more fully below, seal element 44 includes a plurality of primary sealing lips 46 directed toward bearing inner ring 16. These sealing lips provide multiple lubricant dams, in addition to an advantageous combination of labyrinthine and contact sealing structures.

Figure 2:
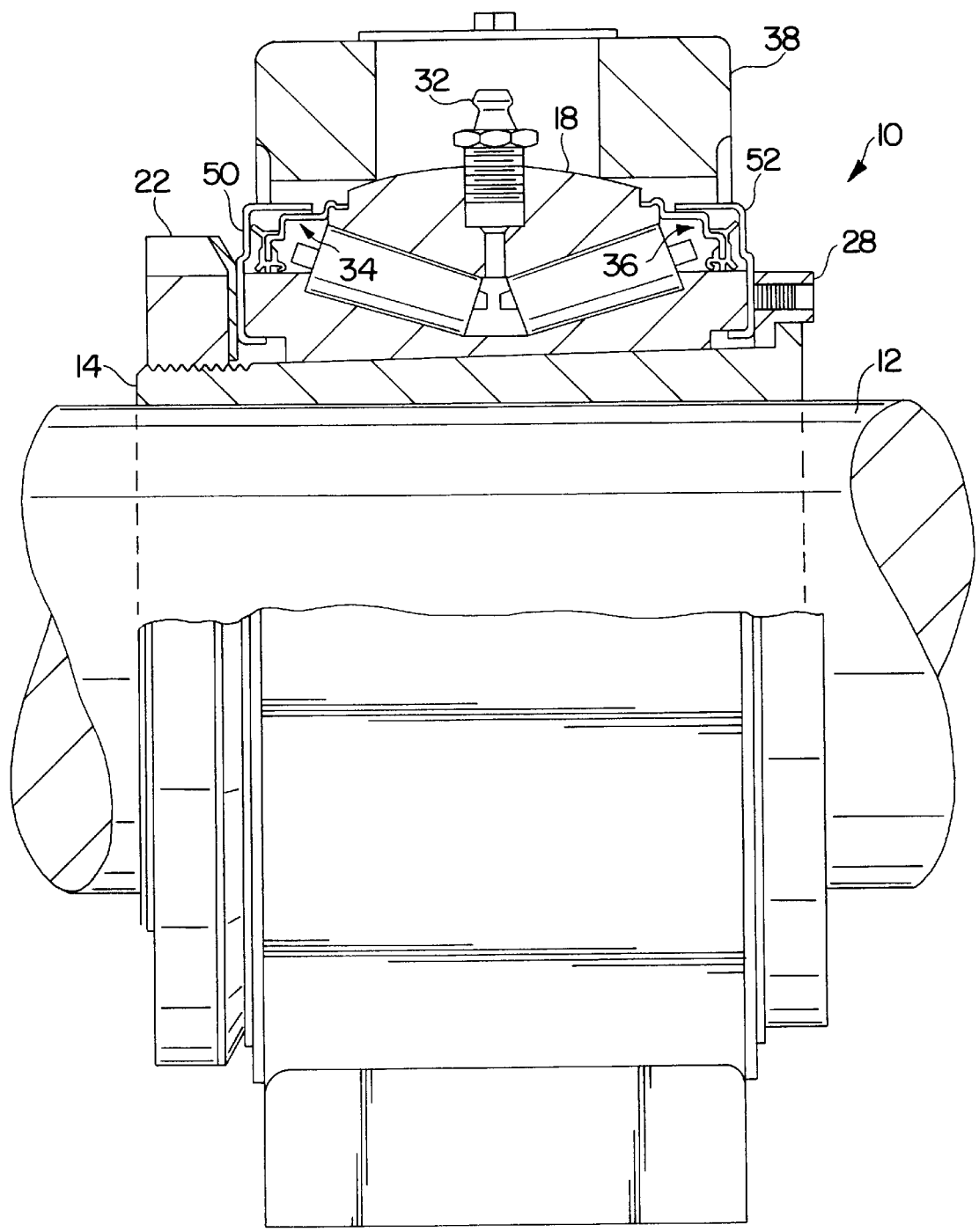
FIG. 2 is a partial cross sectional view of the bearing assembly of FIG. 1 further equipped with optional flinger elements.

As can be seen, seal assembly 34 further includes an outwardly directed secondary sealing lip 48. Sealing lip 48 is utilized to provide still further sealing when bearing assembly 10 is equipped with optional flinger elements. Flinger elements are especially desirable in applications where a high degree of sealing is necessary but may be advantageously used in a variety of low speed applications such as conveyors. Due to its configuration, sealing lip 48 facilitates egress of matter (such as expelled lubricant) from the interior of bearing assembly 10 while inhibiting ingress of extraneous material from the ambient environment FIG. 2 illustrates bearing assembly 10 provided with flinger elements 50 and 52 in opposition to the respective seal carriers of seal assemblies 34 and 36. In this case flinger element 50 is advantageously maintained in position by nut 22 whereas flinger element 52 is maintained by removal ring 28. In some cases it may be desirable to tighten the screw members of removal ring 28 against flinger element 52 to further ensure that it remains firmly in position.

Figure 2A:
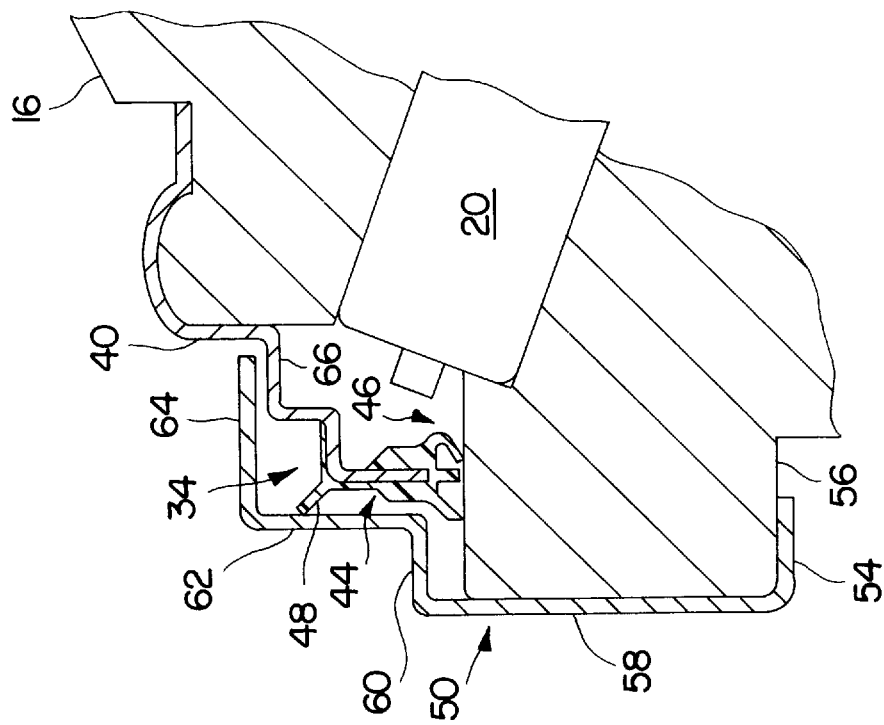
FIG. 2A is an enlarged partial cross sectional view of a seal assembly as in FIG. 2.

The configuration of flinger element 50 can be most easily seen explained with reference to FIG. 2A. It will be appreciated that flinger element 52 will be similarly constructed. As can be seen, flinger element 50 includes a retaining flange 54 received into an annular channel 56 defined in bearing inner ring 16. Retaining flange 54 thus serves to maintain flinger element 50 in a position coaxial with shaft 12.

Flinger element 50 further includes a first radial portion 58 located adjacent the end face of bearing inner ring 16. A first axial portion 60 integrally extends from first radial portion 58 in an inward axial direction. A second radial portion 62 integrally extends from first axial portion 60 at a position offset from first radial portion 58. A second axial portion 64 is also provided, integrally extending from second radial portion 62. As can be seen, second axial portion 64 is closely spaced to an opposed axial portion 66 of seal carrier 40.

Figure 4:
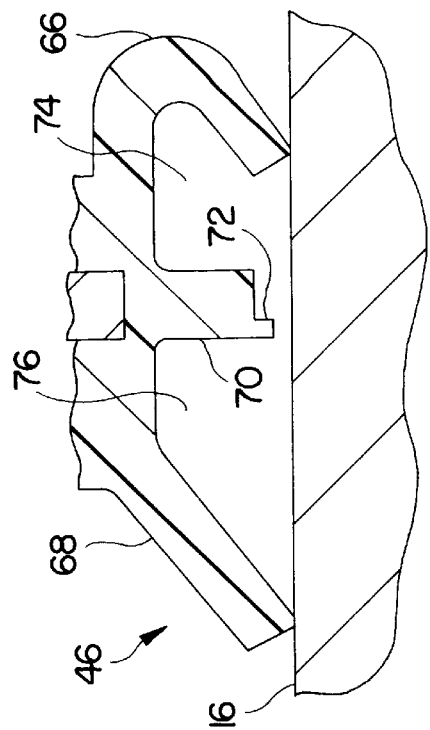
FIG. 4 is a fragmentary view illustrating various primary sealing lips of a seal assembly as in FIGS. 1 and 2.

The operation of the sealing arrangement utilizing sealing assembly 34 and flinger element 50 will now be described with reference to FIGS. 3 and 4. As can be seen, the primary sealing lips 46 may include an interior rolled land riding contact seal 66 and an exterior oblique contact seal 68, both of which positively engage the outer surface of bearing inner ring 16. Like sealing lip 48, contact seals 66 and 68 are configured to permits egress of expelled lubricant and entrained impurities, while inhibiting ingress of extraneous matter.

A depending center lip 70 is located between seals 66 and 68. In the illustrated embodiment, a predetermined gap is provided between center lip 70 and the outer surface of bearing inner ring 16. In this case, there is no direct contact between center lip 70 and bearing inner ring 16 during operation. For example, center lip 70 may be configured to provide a spacing of approximately zero to fifteen thousandths of an inch with bearing inner ring 16. In other cases, it may be desirable to provide a light contact with bearing inner ring 16, such as by tear lip 72 produced in the molding process.

Center lip 70 thus provides a close-running labyrinthine seal structure without producing frictional heat that would be caused by more direct contact. Center lip 70 also adds rigidity to contact seals 66 and 68. As a result, contact seals 66 and 68 may engage bearing inner ring 16 at a more optimum force with less friction. This may further serve to reduce heat built up in the seal region during operation.

Figure 3:
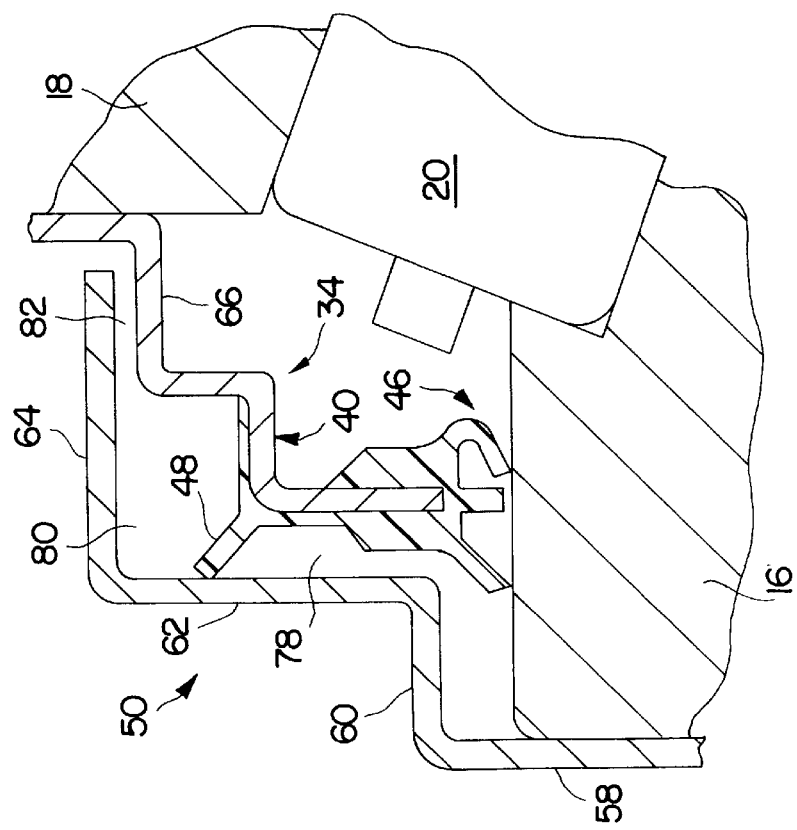
FIG. 3 is a still further enlargement of a seal assembly as in FIG. 2.

During operation, the seal arrangement shown in FIG. 3 advantageously provides a total of ten sealing barriers over a very short axial span. As a result, very effective sealing is achieved without requiring relatively large axial spaces as have often been necessary in the past. In many applications, a minimum axial space will be dictated by equipment parameters or other considerations.

These barriers will now be described in order, as seen from the interior of bearing assembly 10. The first barrier is rolled land riding contact seal 66. The second barrier is a grease cavity barrier, i.e., a lubricant dam, provided the region (indicated at 74) between land riding contact seal 66 and center lip 70. The third barrier is a labyrinthine seal between center lip 70 and bearing inner ring 16.

Another lubricant dam in the region (indicated at 76) between center lip 70 and oblique contact seal 68 provides the fourth sealing barrier. The fifth sealing barrier is provided by seal 68 itself. The sixth sealing barrier is another lubricant dam formed in the region (indicated at 78) between seal 68 and secondary sealing lip 48. Secondary sealing lip 48 provides the seventh sealing barrier, The eighth sealing barrier is formed by a lubricant dam in the region (indicated at 80) immediately after sealing lip 48. The closely spaced region (indicated at 82) between second axial portion 64 of flinger element 50 and the opposed axial portion 66 of seal carrier 40 forms a labyrinthine seal structure, and thus provides the ninth sealing barrier. The tenth sealing barrier is flinger element 50 itself, which tends to throw extraneous matter away from bearing assembly 10 in a known manner.

Figure 5:
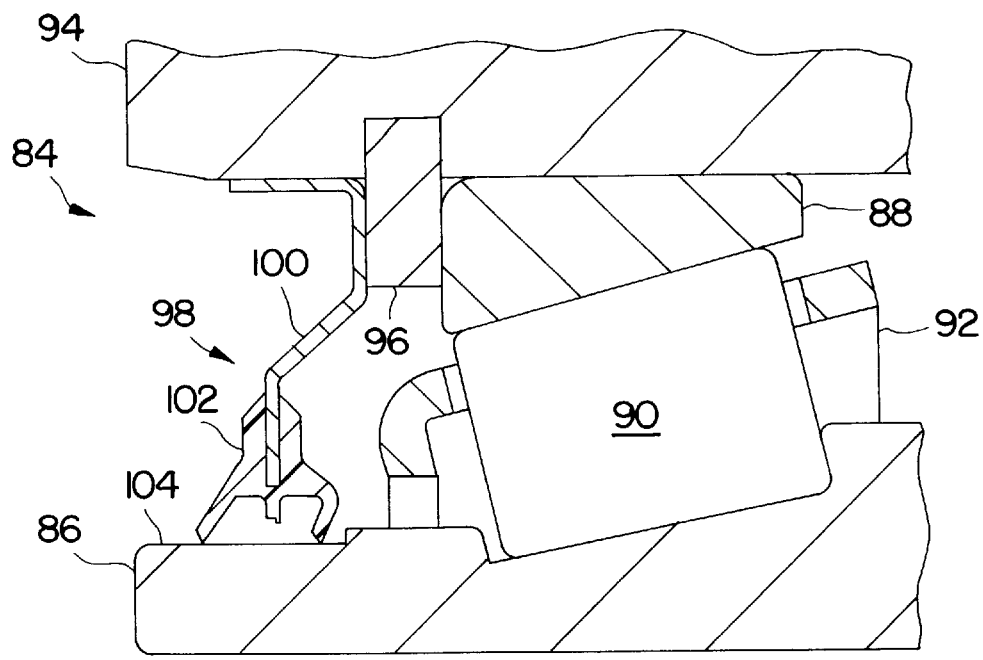
FIGS. 5 and 6 are partial cross sectional views of another bearing assembly constructed in accordance with the present invention, with and without optional flinger elements

FIG. 5 illustrates an alternative bearing assembly 84 constructed in accordance with the present invention. Bearing assembly 84 includes a bearing inner ring 86 and bearing outer ring 88 defining opposed raceways in a conventional manner. A plurality of bearing elements, such as roller bearing 90, are located in the bearing region between the opposed raceways. Typically, the bearing elements are retained in their relative positions by a cage element 92.

As can be seen, bearing outer ring 88 is retained in position within the bearing's housing 94 by a snap ring 96. A seal assembly 98 includes a configured seal carrier 100 press fit into the housing bore. As a result, seal carrier 100 will be fixed with respect to bearing outer ring 88 during rotation of bearing inner ring 86. A resilient seal element 102 is fixed to seal carrier 100 to provide sealing with bearing inner ring 86 during such rotation. In this case, sealing element 102 includes three sealing lips similar to the primary sealing lips of seal assembly 34.

Figure 6:
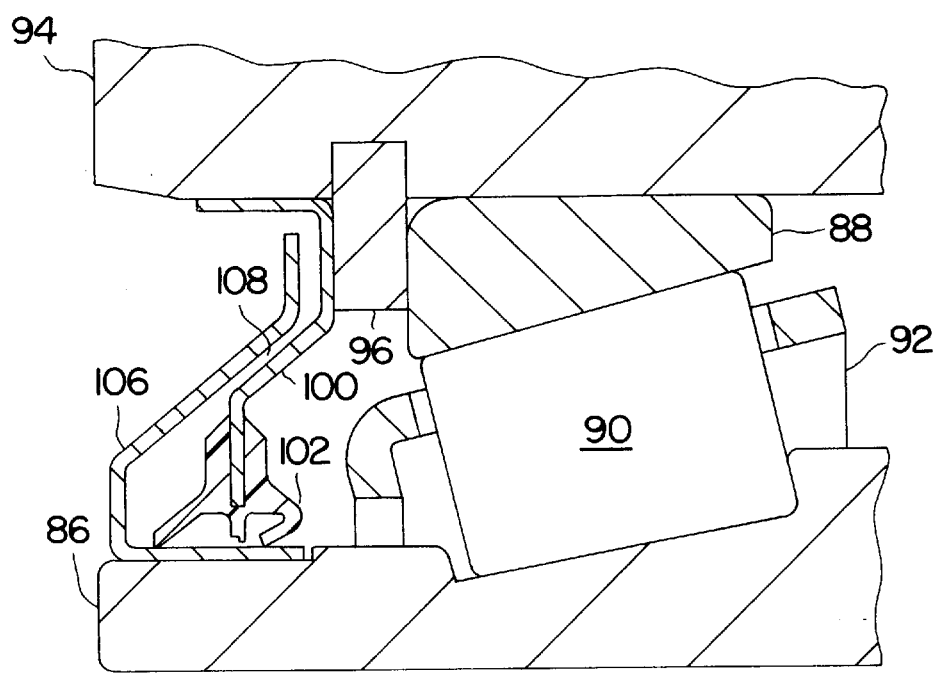

In the illustrated embodiment, bearing inner ring 86 defines a receiving groove 104 into which a flinger element 106 can be press fit as shown in FIG. 6. Preferably, flinger element 106 may be configured to oppose seal carrier 100 in a manner that further enhances overall sealing performance. For example, the closely spaced region indicated at 108 forms an effective labyrinthine seal structure that inhibits ingress of extraneous matter. Other cavity regions form lubricant dams as described above.

Additional aspects of the present invention can be explained with reference to FIG. 7, where elements common to the embodiment of FIGS. 5 and 6 need not be discussed in detail. In this case, a bearing inner ring 110 is provided having an axial extension portion 112 about which an annular mounting collar 114 is situated. A series of threaded holes defined in mounting collar 114 register with radial holes, such as radial hole 116, defined in axial extension portion 112. Threaded members, such as screw member 118, extend through the radial holes into engagement with the shaft.

A seal assembly 120 includes a configured seal carrier 122 press fit into the housing bore in the manner discussed above. A resilient seal element 124, having three sealing lips as described, is fixed to seal carrier 122. As shown, mounting collar 114 includes an axial protrusion portion 128 configured to oppose seal carrier 122. The closely spaced region indicated at 128 provides a labyrinthine seal structure that provides enhanced sealing characteristics.

Figure 7:
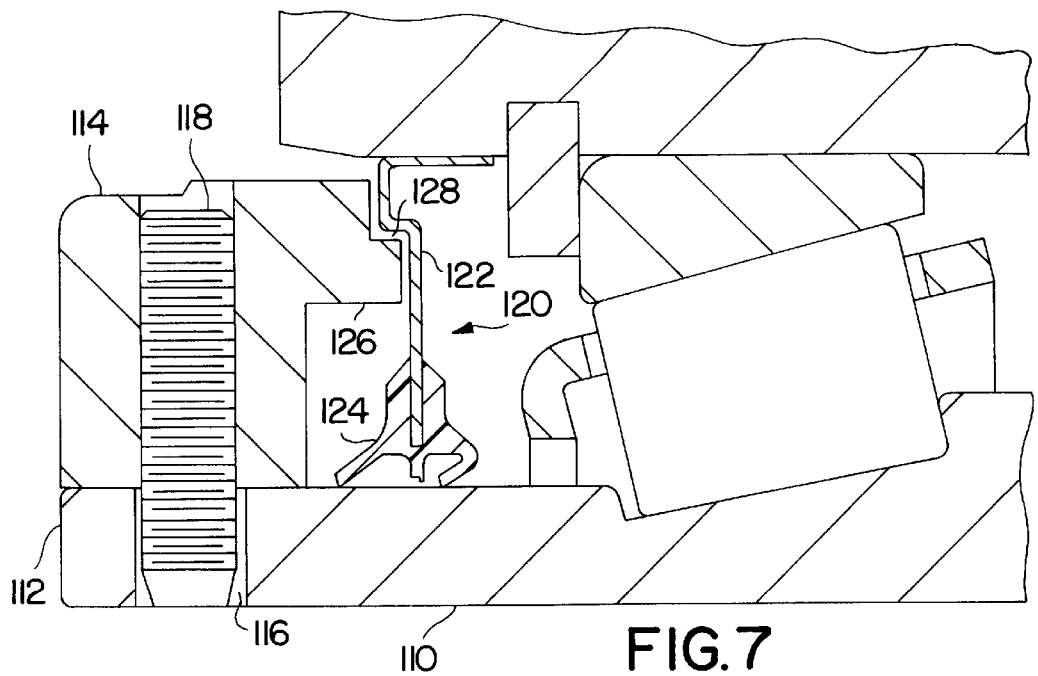
FIGS. 7 and 8 are partial cross sectional views of still further embodiments utilizing alternative mounting collar configurations.
Figure 8:
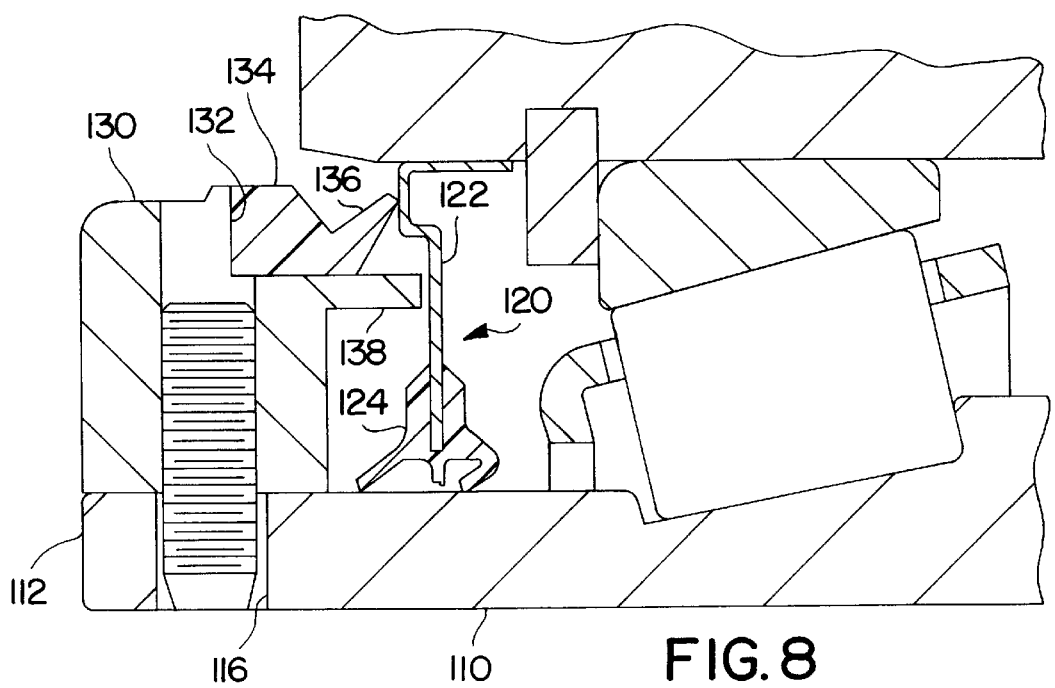

FIG. 8 illustrates an alternative configuration to the embodiment shown in FIG. 7. In this case, a mounting collar 130 is provided defining an annular seating groove 132. A resilient seal element 134, here a V-ring type seal, is located in seating groove 132 as shown. Seal element 134 includes a sealing lip 136 extending into engagement with the outer surface of seal carrier 122. In the illustrated embodiments mounting collar 130 further includes an axial protrusion portion 138 extending to a location near seal carrier 122 to further enhance sealing characteristics.

It can be seen that the present invention provides various novel bearing assemblies incorporating improved sealing arrangements. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A bearing assembly comprising:
    a bearing inner ring defining an inner raceway on an outer surface thereof;
    a bearing outer ring defining an outer raceway on an inner surface thereof, said bearing outer ring being situated with respect to said bearing inner ring such that said outer raceway and said inner raceway are in opposed and spaced apart relation;
    a plurality of bearing elements disposed between said inner raceway and said outer raceway to facilitate relative rotation between said bearing inner ring and said bearing outer ring;
    a seal carrier fixed with respect to said bearing outer ring, said seal carrier extending generally radially inward toward said bearing inner ring;
    a flinger element fixed with respect to said bearing inner ring and rotatable therewith, said flinger element being situated in opposition to said seal carrier;
    a resilient seal element fixed to said seal carrier and having at least two sealing lips extending therefrom into engagement with said bearing inner ring and a secondary lip extending into engagement with said flinger element, one of said at least two sealing lips being a rolled land riding contact seal and another of said at least two sealing lips being an oblique contact seal; and
    wherein said seal carrier and said flinger element are configured to define a lubricant dam region and a labyrinthine seal region between an ambient environment and said secondary lip.

2. A bearing assembly as set forth in claim 1, wherein said bearing inner ring defines a flinger receiving groove, said flinger element being press fit into said flinger receiving groove.

3. A bearing assembly as set forth in claim 1, wherein said flinger element is maintained against an end face of said bearing inner ring.

4. A bearing assembly comprising:
    a bearing inner ring defining an inner raceway on an outer surface thereof;
    a bearing outer ring defining an outer raceway on an inner surface thereof, said bearing outer ring being situated with respect to said bearing inner ring such that said outer raceway and said inner raceway are in opposed and spaced apart relation;
    a plurality of bearing elements disposed between said inner raceway and said outer raceway to facilitate relative rotation between said bearing inner ring and said bearing outer ring;
    a seal carrier fixed with respect to said bearing outer ring, said seal carrier extending generally radially inward toward said bearing inner ring; and
    a resilient seal element fixed to said seal carrier and having at least two sealing lips extending therefrom into engagement with said bearing inner ring, one of said at least two sealing lips being a rolled land riding contact seal and another of said at least two sealing lips being an oblique contact seal, said seal element further comprising a center lip located between said rolled land riding contact seal and said oblique contact seal.

5. A bearing assembly as set forth in claim 4, wherein said center lip is configured to make no more than light engagement with said bearing inner ring.

6. A bearing assembly as set forth in claim 5, wherein said center lip is spaced from said bearing inner ring by a predetermined gap.

7. A bearing assembly as set forth in claim 2, further comprising a second seal element fixed with respect to said bearing inner ring, said second seal element having a seal lip engaging said seal carrier.

8. A bearing assembly as set forth in claim 7, wherein said second seal element is a V-ring seal.

9. A bearing assembly as set forth in claim 8, further comprising an annular mounting element situated axially external of said seal carrier, said V-ring seal being mounted in a seating groove defined in said annular mounting element.

10. A bearing assembly as set forth in claim 4, further comprising an annular mounting element situated axially external of said seal carrier, said annular mounting element including an axial protrusion portion configured to oppose said seal carrier and define a labyrinthine seal structure.

11. A bearing assembly comprising:
a first bearing ring defining a first raceway;
a second bearing ring defining a second raceway, said second bearing ring being situated with respect to said first bearing ring such that said first raceway and said second raceway are in opposed and spaced apart relation;
a plurality of bearing elements disposed between said first raceway and said second raceway to facilitate relative rotation between said first bearing ring and said second bearing ring;
a seal carrier fixed with respect to one of said first bearing ring and said second bearing ring; and
a resilient seal element fixed to said seal carrier and having at least three sealing lips extending therefrom into engagement with another of said first bearing ring and said second bearing ring, said at least three sealing lips including a rolled land riding contact seal, an oblique contact seal and a center lip located therebetween.

12. A bearing assembly as set forth in claim 11, wherein said center lip is configured to make no more than light engagement with said another of said first bearing ring and said second bearing ring.

13. A bearing assembly as set forth in claim 12, wherein said center lip is spaced from said another of said first bearing ring and said second bearing ring by a predetermined gap.

14. A bearing assembly as set forth in claim 11, further comprising a flinger element fixed with respect to said another of said first bearing ring and said second bearing ring and rotatable therewith, said flinger element being situated in opposition to said seal carrier.

15. A bearing assembly as set forth in claim 14, wherein said seal element further comprises a secondary lip extending from said seal carrier into engagement with said flinger element.

16. A bearing assembly as set forth in claim 14, wherein said seal carrier and said flinger element are configured to define a labyrinthine seal structure.

17. A bearing assembly for receipt of a shaft therein, said bearing assembly comprising:
a tapered adapter defining a first axial bore for receipt of the shaft therethrough and further defining a tapered outer surface;
a bearing inner ring defining a second axial bore having a tapered inner surface for receipt of said tapered adapter therein;
a bearing outer ring situated radially outward of said bearing inner ring to define a bearing region therebetween;
a plurality of bearing elements disposed in said bearing region to facilitate relative rotation between said bearing inner ring and said bearing outer ring;
first and second seal carriers located on respective opposite sides of said bearing region, said seal carriers being fixed with respect to said bearing outer ring; and
first and second resilient seal elements respectively fixed to said first and second seal carriers, each of said seal carriers having at least two contact lips and at least one labyrinth lip located therebetween, said at least two contact lips being configured to permit egress of lubricant while inhibiting ingress of extraneous matter.

18. A bearing assembly as set forth in claim 17, wherein one of said at least two contact lips is a rolled land riding contact seal and another of said at least two contact lips is an oblique contact seal.

19. A bearing assembly for receipt of a shaft therein, said bearing assembly comprising:
a tapered adapter defining a first axial bore for receipt of the shaft therethrough and further defining a tapered outer surface;
a bearing inner ring defining a second axial bore having a tapered inner surface for receipt of said tapered adapter therein;
a bearing outer ring situated radially outward of said bearing inner ring to define a bearing region therebetween;
a plurality of bearing elements disposed in said bearing region to facilitate relative rotation between said bearing inner ring and said bearing outer ring;
first and second seal carriers located on respective opposite sides of said bearing region, said seal carriers being fixed with respect to said bearing outer ring;
first and second resilient seal elements respectively fixed to said first and second seal carriers, each of said seal carriers having at least two contact lips and at least one labyrinth lip located therebetween; and
first and second flinger elements fixed with respect to said bearing inner ring and rotatable therewith, said flinger elements being situated in respective opposition to said first and second seal carriers.

20. A bearing assembly as set forth in claim 19, wherein each of said seal elements further comprises a secondary lip extending into engagement with a respective of said flinger elements.

21. A bearing assembly as set forth in claim 20, wherein each of said seal carriers and said flinger elements are configured to define a labyrinthine seal region between an ambient environment and said flinger lip.

22. A bearing assembly as set forth in claim 19, wherein said flinger elements are maintained against respective end faces of said bearing inner ring.

23. A bearing assembly as set forth in claim 22, further comprising an annular nut and an annular removal ring located on respective axial sides of said bearing inner ring, said first flinger element being maintained by said annular nut and said second flinger element being maintained by said removal ring.

* * * * *